(12) United States Patent
Alasaarela et al.

(10) Patent No.: US 11,740,458 B2
(45) Date of Patent: Aug. 29, 2023

(54) PROJECTION DEVICE AND PROJECTION METHOD FOR HEAD MOUNTED DISPLAY BASED ON ROTARY MEMS FAST SCANNER

(71) Applicant: MICROSOFT TECHNOLOGY LICENSING, LLC, Redmond, WA (US)

(72) Inventors: Tapani Matias Alasaarela, Espoo (FI); Simo Kaarlo Tapani Tammela, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 560 days.

(21) Appl. No.: 16/523,706

(22) Filed: Jul. 26, 2019

(65) Prior Publication Data

US 2021/0026138 A1 Jan. 28, 2021

(51) Int. Cl.
*G02B 27/01* (2006.01)
*G03B 21/00* (2006.01)
*G03B 21/20* (2006.01)

(52) U.S. Cl.
CPC ..... *G02B 27/0172* (2013.01); *G02B 27/0176* (2013.01); *G03B 21/008* (2013.01); *G02B 2027/0178* (2013.01); *G03B 21/2033* (2013.01)

(58) Field of Classification Search
CPC ............ G02B 27/0172; G02B 27/0176; G02B 2027/0178; G02B 26/101;

(Continued)

(56) References Cited

U.S. PATENT DOCUMENTS 8,570,244 B2 10/2013 Mukawa
9,851,563 B2 12/2017 Gao et al.
(Continued)

FOREIGN PATENT DOCUMENTS

| EP | 1536267 A1 | 6/2005 |
| EP | 1628155 A1 | 2/2006 |
| JP | 2016157135 A | 9/2016 |

OTHER PUBLICATIONS

Iwamoto, et al., "High resolution, wide view angle head mounted display using eye movement tracking: system structure and evaluation experiments", In Proceedings of 4th IEEE International Workshop on Robot and Human Communication, Jul. 5, 1995, pp. 289-294.

(Continued)

*Primary Examiner* — James C. Jones
*Assistant Examiner* — Henry Duong
(74) *Attorney, Agent, or Firm* — Workman Nydegger

(57) ABSTRACT

A projector system in a head mounted display (HMD). The projector system includes a microscopic mirror. A microelectromechanical system (MEMS) is coupled to the microscopic mirror. The MEMS is configured to tilt the microscopic mirror at a varying scan angle in a first periodic fashion along a single scanning axis. A rotary platform is coupled to the microscopic mirror. The rotary platform is configured to rotate the microscopic mirror about a rotation axis in a second periodic fashion. A light emitter is configured to direct light into the mirror. The light emitter is configured to be modulated based on the position of the microscopic mirror due to the microscopic mirror being tilted along the scanning axis and rotated about the rotary axis.

20 Claims, 15 Drawing Sheets

(58) Field of Classification Search
CPC ........ G02B 2027/0159; G02B 27/0149; G02B 26/085; G02B 26/0816; G02B 26/10; G02B 26/105; G02B 26/108; G02B 26/12; G03B 21/008; G03B 21/2033
USPC ...................................................... 359/201.2
See application file for complete search history.

(56) References Cited

U.S. PATENT DOCUMENTS

| | | | |
|---|---|---|---|
| 2006/0039059 A1* | 2/2006 | Ji | G02B 26/0841 |
| | | | 359/202.1 |
| 2008/0150936 A1* | 6/2008 | Karman | H04N 13/376 |
| | | | 345/419 |
| 2010/0290142 A1* | 11/2010 | Krastev | G02B 26/0833 |
| | | | 359/872 |
| 2013/0016413 A1 | 1/2013 | Saeedi et al. | |
| 2017/0255012 A1 | 9/2017 | Tam et al. | |
| 2018/0045960 A1 | 2/2018 | Palacios et al. | |
| 2018/0364483 A1* | 12/2018 | Mallinson | A63F 13/24 |

OTHER PUBLICATIONS

"International Search Report and Written Opinion Issued in PCT Application No. PCT/US20/036888", dated Sep. 9, 2020, 10 Pages. (MS# 406962-WO-PCT).

* cited by examiner

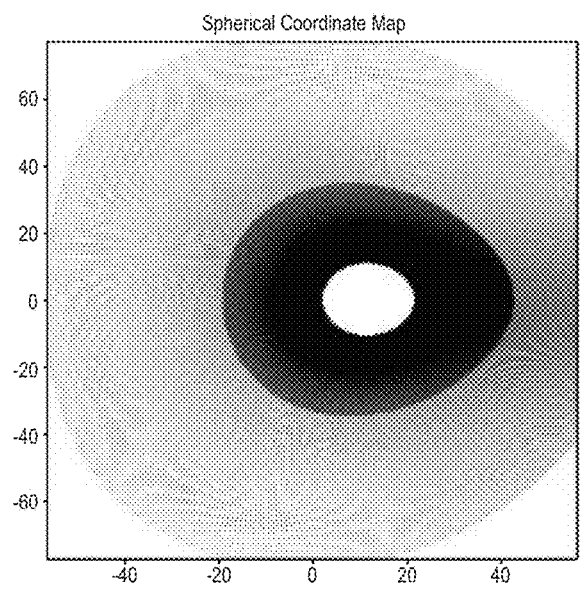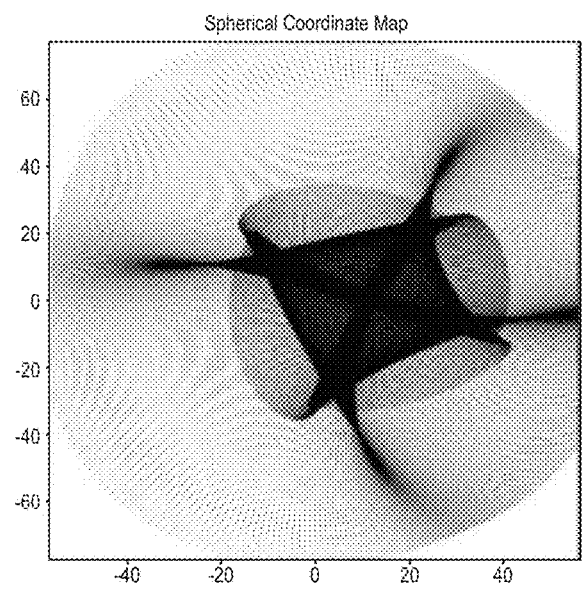
FIG. 12                    FIG. 13

PROJECTION DEVICE AND PROJECTION METHOD FOR HEAD MOUNTED DISPLAY BASED ON ROTARY MEMS FAST SCANNER

BACKGROUND

Background and Relevant Art

Computers and computing systems have affected nearly every aspect of modern living. Computers are generally involved in work, recreation, healthcare, transportation, entertainment, household management, etc.

Computing systems have been implemented which provide virtual reality or augmented reality. In a virtual reality system, a user is placed into a virtual environment where the user can interact with the virtual environment, including interacting with virtual objects in the virtual environment. In an augmented reality system, an actual environment is augmented with virtual objects. That is, the user interacts with the actual environment that the user is present in, but is also presented with virtual objects that the user can interact with.

A head mounted device (HMD) used with an augmented or virtual reality system is, as its name suggests, worn by the user on the user's head. The HMD includes various sensors, projection elements, optical elements (such as lenses), computing hardware, networking hardware, etc. Typically, an HMD will project an image to a user using a projector that implements a raster scan. These projectors often use microelectromechanical systems (MEMS), which are microscopic mechanical systems. In particular, using modern semiconductor manufacturing techniques, engineers and scientists have been able to create mechanical systems with moving parts that exist at a microscopic level.

This technology has allowed for the invention of very small devices. One such device is a miniaturized projector. Such miniaturized projectors include lasers emitting light towards two mirrors where the mirrors are coupled to mechanical elements of a MEMS. The MEMS can control the mirrors to perform a raster scan to display video content to a user, where one mirror is configured to control light movement in a horizontal direction and the other mirror is configured to control light movement in a vertical direction. Such projectors can be used in virtual reality and augmented reality applications, or other miniaturized projector applications.

A typical raster scan implements a method of displaying an image using a substantially rectangular pattern by illuminating individual pixels of the rectangle sequentially in an efficient manner by moving one or more mirrors to adjust where output from the lasers is directed. In particular, a raster scan will typically begin at a top corner at a first side of the rectangle and begin horizontally (and slightly vertically) illuminating pixels in a first row from the first corner of the first side of the rectangle to an opposing corner (approximately) on an opposing second side of the rectangle. Once the opposing side is reached, the signal is blanked during a horizontal blanking interval when the raster scan, without illuminating any pixels, horizontally (and slightly vertically) moves back towards the first side. This process repeats back and forth until the bottom of the rectangle is reached and all of the pixels have been illuminated. The raster scan then performs a blanking operation during a vertical blanking interval, whereby the mirrors are adjusted such that the mirrors are moved from a position that reflects light on a bottom corner at the second side of the rectangle to the top corner at the first side and top of the rectangle. This positions the mirror in the appropriate location for a next frame of video.

The raster scan techniques described above typically result in a rectangular image is that is uniform throughout the image in terms of resolution and brightness. That is, a portion of the image at the edge of the rectangle will be rendered with the same resolution and brightness as a portion of the image in the middle of the rectangle irrespective of where a user is looking.

However, human sight, at any given time, generally perceives high levels of detail in only a rather small area of a total visual perception, typically in the middle of the perception, where the user is looking. Thus, previous systems use significant resources in rendering high-resolution images, where only a portion of the high-resolution data in the images is ever consumed by a user. That is, each high-resolution frame of image data, will only have a small portion that needs to be high-resolution (as compared to other portions of the image), resulting in wasted resources in rendering high-resolution data for other portions of the image, when lower resolution data would suffice.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes a projector system in a head mounted display (HMD). The projector system includes a microscopic mirror. A microelectromechanical system (MEMS) is coupled to the microscopic mirror. The MEMS is configured to tilt the microscopic mirror at a varying scan angle in a first periodic fashion along a single scanning axis. A rotary platform is coupled to the microscopic mirror. The rotary platform is configured to rotate the microscopic mirror about a rotation axis in a second periodic fashion. A light emitter is configured to direct light into the mirror. The light emitter is configured to be modulated based on the position of the microscopic mirror due to the microscopic mirror being tilted along the scanning axis and rotated about the rotary axis.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 12 illustrates a graph showing a scan pattern with a hole;

FIG. 13 illustrates a graph showing a scan pattern using a modulated position between a scan axis and a rotary axis;

DETAILED DESCRIPTION

In worn display applications, or other applications, it would be useful to have higher resolution, more accurate portions of an image where the user is looking and sacrifice on the resolution and accuracy in portions of the image that are in a user's peripheral vision. This can be accomplished by a projector system that has a more curvilinear scan pattern, with higher resolution scanning in a portion of an image where a user is looking (as compared to a relatively lower resolution scanning in a user's peripheral vision), instead of relying on roughly straight-line rectangular raster scans that have the same resolution in all portions of an image. Indeed, in some embodiments, the higher resolution, accurate areas of a series of frames follow eye movements such that the highest resolution, most accurate portion of an image is approximately in the middle of the user's perception where human eye perception is the most accurate.

Some embodiments illustrated herein implement such eye-optimized scanning patterns by implementing a MEMS fast scanner in a single scanning axis in conjunction with a rotary platform. Embodiments can adjust modulation of an incoming beam of light, the incoming beam axis, tilt of the mirror (by periodic modulation about a scanning axis), rate at which the mirror is tilted about a scanning axis, rate and phase of rotation of the mirror, and/or an orientation of the rotation axis with respect to the scanning axis to get a desired scan pattern.

Figure 1:
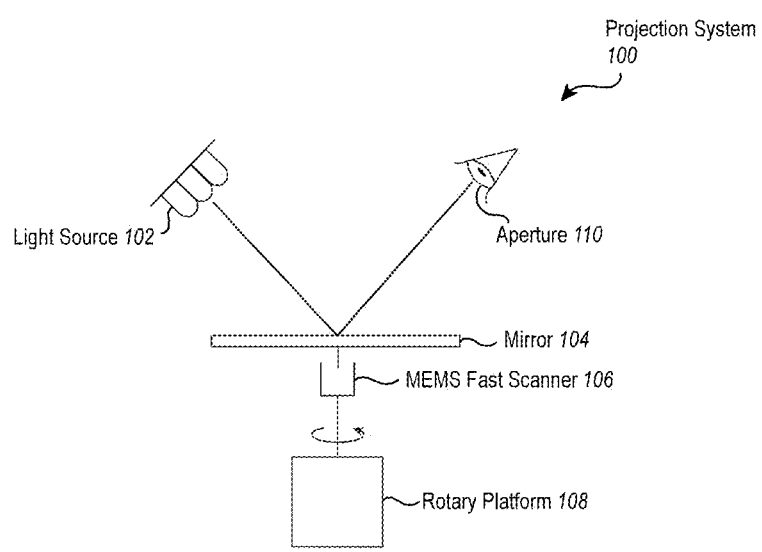
FIG. 1 illustrates an example system for projecting using a MEMS and rotary platform.

Referring now to FIG. 1, an example projection system 100 is illustrated. FIG. 1 illustrates a projection system 100 including a light source 102. For example, the light source 102 may be a number of different light emitters, such as light emitting diodes, lasers, or other light emitters that emit light for creating an image. In the example illustrated in FIG. 1, the light source 102 includes three LEDs, which may be for example a red LED, a green LED, and a blue LED. The light source 102 is modulated to output different colors and intensities of light depending on the conditions and state of other elements in the projection system 100.

In particular, as will be discussed in more detail below, the angle of a mirror 104 and the rotational position of the mirror 104 will determine where light from the light source 102 is directed. The physical location where the reflected light lands is a physical location of an image. Therefore, the light source 102 will be modulated with light colors and intensities that correspond to the desired light colors and intensities of the image at the particular location where the reflected light lands. Thus, an image can be drawn, location by location, by adjusting the color and intensity of the light source 102 to correspond with the desired color and intensity of light at a location where reflected light from the light source 102 lands.

As discussed previously, the projection system 100 includes a mirror 104. In particular, the mirror 104 is a micromirror coupled to a MEMS fast scanner 106. The MEMS fast scanner 106 can cause the mirror 104 to tilt. Typically, the MEMS fast scanner 106 will cause the mirror to tilt along a single scanning axis. Although in other embodiments, the MEMS fast scanner 106 may be configured to cause the mirror 104 to tilt in two axes. However, as noted previously, the typical embodiments will cause the MEMS fast scanner 106 to tilt in a single axis. In particular, the mirror 104 will typically be tilted back and forth across a scanning angle range, at some rate. Thus, the mirror will have a scanner rate including a period for a given cycle of moving back and forth. Note that the mirror tilting may be controlled by some periodic waveform driving a MEMS machine such as a sinusoidal waveform, sawtooth waveform, triangular wave form, or other appropriate waveform that controls the tilting back and forth along the scanning axis.

To create a 2D image, the mirror 104 is rotated using a rotary platform 108. The rotary platform 108 rotates the mirror 104 about a rotation axis. Each rotation has a period. Thus, the rotation is at some periodic rate. Typically, the rate is constant, but in some embodiments, the rate may be variable to accomplish certain image generation purposes. The rotary platform can be implemented e.g. with a miniature brushless DC motor. In case modulation in the rotation axis is also wanted, the motor axis could be connected to the rotating mirror with a swivel/ball joint. Separate rails/tracks for guiding the tilt could also be implemented. In some embodiments, a gearbox may also be implemented to increase or decrease rotation speed.

As the mirror 104 is rotated, this will cause light to be reflected in two dimensions rather than simply a single dimension as would be the case for a MEMS fast scanner along a single scanning axis with no rotation.

As illustrated in FIG. 1, the light source 102 emits light which is directed to an aperture 110. The aperture 110 is the desired location where an image is drawn by the light source 102, or at least provided to other systems, lenses, etc. for drawing the image. In the example illustrated in FIG. 1, the aperture 110 is a human eye. Although it should be appreciated that in other embodiments the aperture may be various lenses, sensors, or other devices. Note that the tilting of the mirror 104 by the MEMS fast scanner 106 and the movement of the mirror 104 by the rotary platform 108 will cause light from the light source 102 to be directed to different portions of the aperture 110 to draw a 2D image into the aperture 110.

While the image is shown being reflected directly to the user's eye, typical embodiments reflect the image to a waveguide (not shown) that then transfers the image to the eye. Alternatively or additionally, embodiments may include relay optics on the way to the input pupil of the waveguide. Alternatively, the light could be input into other types of mirrors/prism optics to transfer the projected image into a viewable one As noted previously, the aperture 110 may be any one of a number of different devices, including a human eye. Thus, as will be illustrated in more detail below, some embodiments may be implemented in a head mounted display (HMD) application for projecting a series of images to a human user. However, it should be appreciated that embodiments of the invention may be used for other projectors and other devices. For example, embodiments may be used to project images onto a screen viewable by a user. In particular, embodiments can be used to create high-resolution portions of an image on a screen in a portion of the screen being directly looked at by a user while projecting lower resolution portions of the image on the screen in the user's peripheral vision.

The following now illustrates various details about how the mirror 104 may be tilted by the MEMS fast scanner 106 and how the mirror 104 may be rotated by the rotary platform 108. Additionally, the following illustrates how the light source 102 can be modulated with respect to tilting of the mirror 104 and rotation of the mirror 104.

Figure 2:
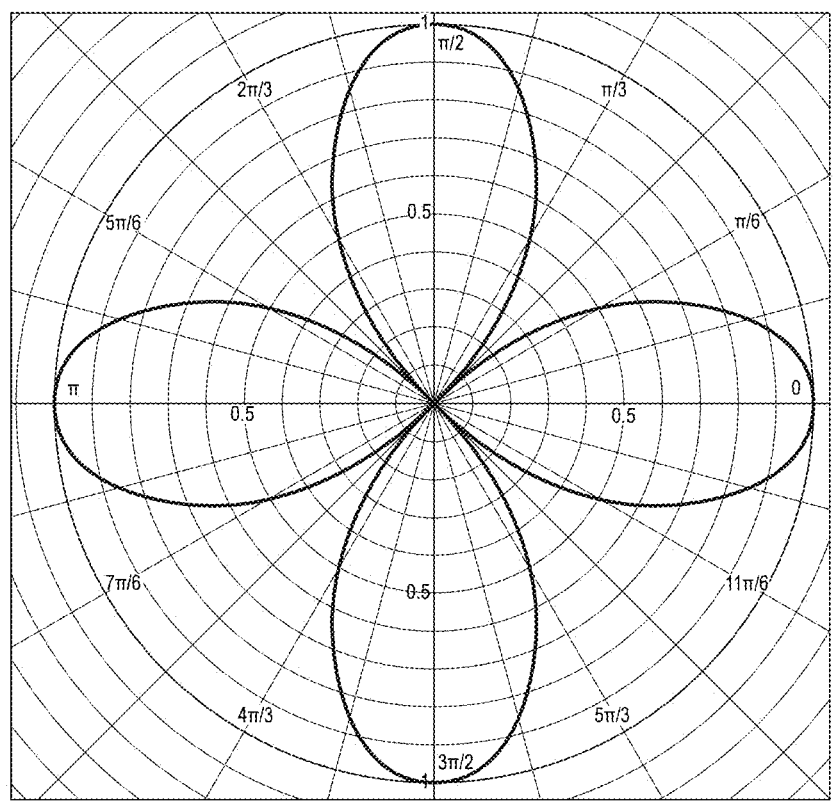
FIG. 2 illustrates a graph showing a scan pattern of the system.

Referring now to FIG. 2, a direct incidence to the rotating fast scanner 106 causes the scan path to roughly follow the formula: $r=a \cos(b\theta)$, where r is a radius distance from center, $\theta$ is the rotational angle of the rotary platform 108, and a and b are constants.

If scanning is a times faster than rotation and if b is an even number, embodiments can draw 4*b pixels per full rotation for each distance r. If scanning is a times faster than rotation and if b is an odd number, embodiments will draw 2*b pixels each half rotation for each distance r.

As noted, this scan pattern is illustrated in FIG. 2. In particular, a 'flower' shaped scan is produced in contrast to the substantially rectangular scans of previous raster scan projectors.

Note that a direct incidence angle, in practice, is very difficult to implement in a reflective scanner and thus some embodiments are implemented to function using projection from non-direct incidence.

Figure 3:
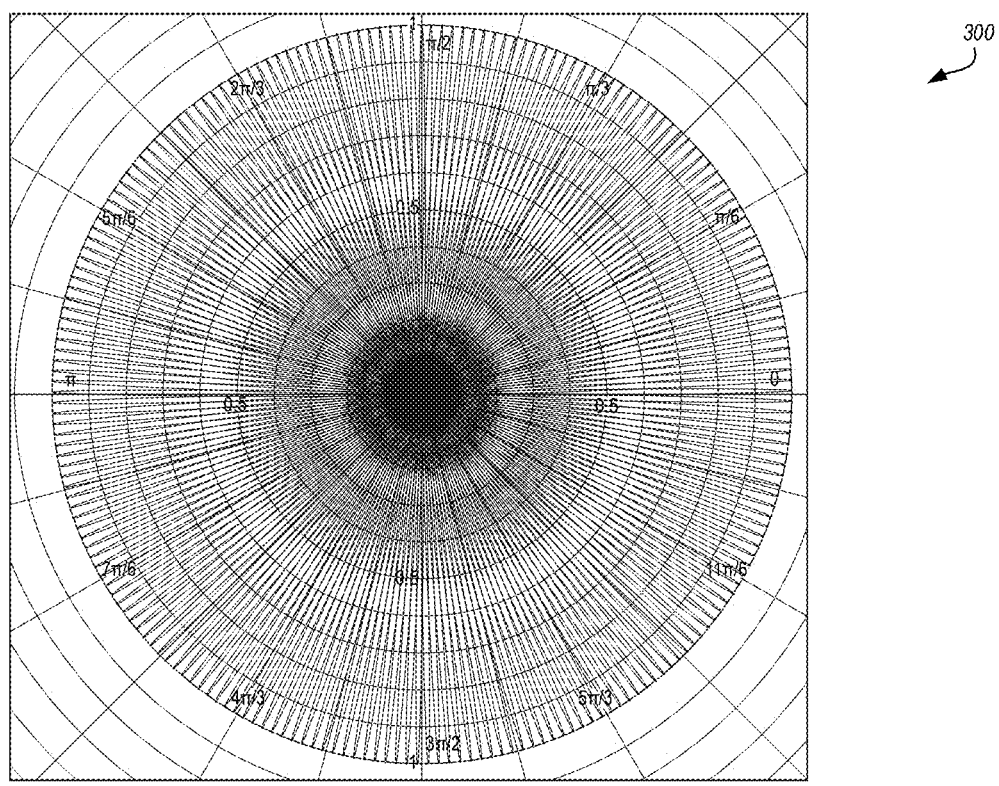
FIG. 3 illustrates a graph showing a scan pattern of the system.

Referring now to FIG. 3, consider a system with a 50 Hz refresh rate (i.e., 50 frames per second for video output) for 400 pixels per rotation of the rotary platform 108. Such a system, assuming a single color and intensity produced by the light source 102, would result in approximately the scan 300 shown in FIG. 3, and a corresponding image, drawn 50 times per second. Note that in other embodiments, different colors and intensities will be output by the light source depending on the tilt of the mirror about the scanning axis and rotational position of the mirror about the rotating axis. This may be facilitated, for example, by using a closed-loop feedback system. For example, an encoder could be implemented on the rotary axis to provide information about the rotational position of that axis. A tilt and/or pressure sensor, such as a piezoresistor could be implemented on the MEMS mirror for the scanning axis to determine tilt. Using the rotational position and tilt position, light colors and intensities could be selected for the light source.

Note that if the rate of rotation of the rotary platform 108 and the rate of scanning of the MEMS fast scanner 106 scanning are not perfectly harmonically matched (i.e., the rotation period and scanning period are not harmonics of each other) the locations on the edge of the scan will travel between the scans and the pixels drawn will fill the gaps illustrated in FIG. 3 (but may cause flicker). In some embodiments, the period of the scanning and the period of the rotation are intentionally selected to be harmonically disparate to fill gaps in a scan to produce a more uniform image with smaller and/or fewer gaps.

Some embodiments may include an intentionally introduced fixed phase shift to the rotation of the rotating platform. For example, some embodiments may set b=100.2. In such embodiments, the scan will rotate between the scans so that subscans are produced. The subscans allow for a lower the refresh rate for each individual pixel to get a higher resolution (as compared to systems without subscans). For example, to get a 50 Hz refresh rate with 5 subscans, embodiments implement a 250 Hz rotation. The subscans can alternatively or additionally act as a way to distribute the drawing of the image more uniformly and have the possibility of getting much higher refresh rates at the center parts of the image.

Note however that some embodiments could be implemented without the subscans. In the running example, embodiments could use a 50 Hz rotation and draw the edge pixels in a counter clockwise order around the circle, which would result in the same scan image. In yet another alternative embodiment, using the subscans, embodiments could be implemented to draw, for example, every 5th pixel on each full rotation instead of drawing them all.

The rotation speed and the number of subscans can be optimized to give the best experience to the user. In some embodiments, this can be user specific. In particular, embodiments may provide a calibration mode that allows users to adjust the constant b to obtain an optimal value. In other embodiments, eye scanners in an HMD device can monitor the location and/or focusing actions of a user's eye to attempt to identify an optimal value.

Figure 4:
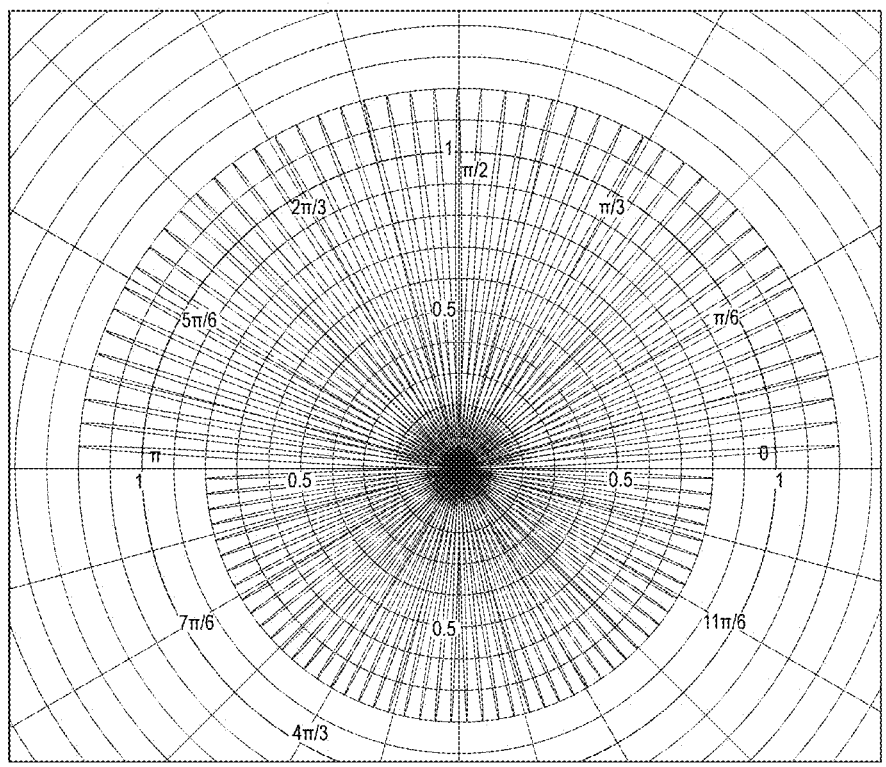
FIG. 4 illustrates a graph showing a scan pattern for a half cycle using a biased tilt for the system.
Figure 5:
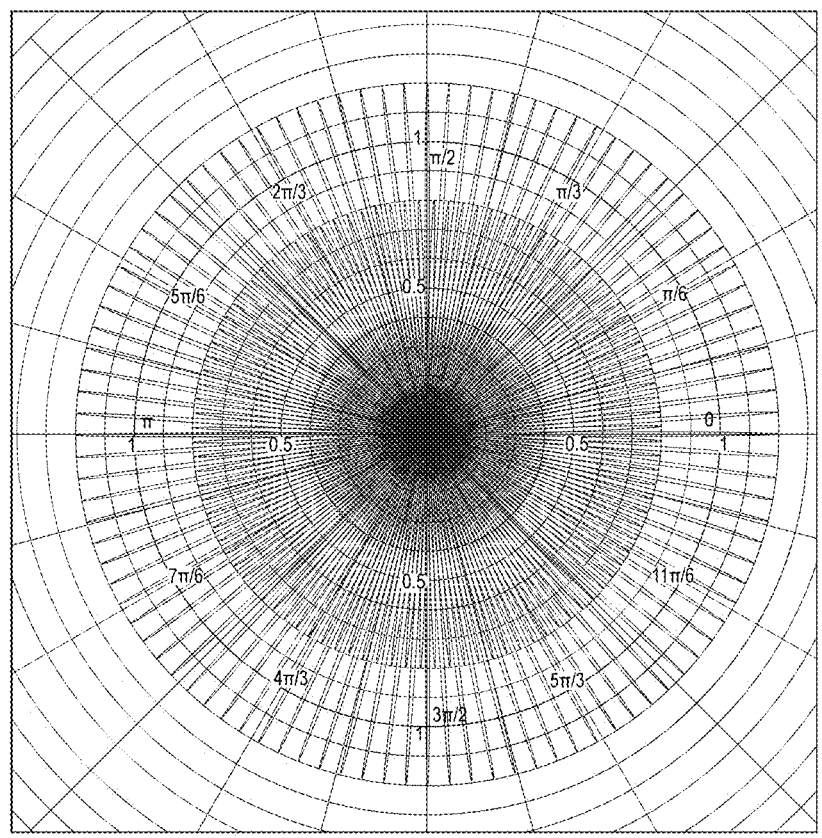
FIG. 5 illustrates a graph showing a scan pattern for a full cycle using a biased tilt for the system.

As illustrated in FIGS. 4 and 5, some embodiments can introduce a small bias to the angle of the rotating mirror, so that the scanning is not around a 0° angle, but is slightly shifted. In particular, the mirror is tilted about the scanning axis such that tilting the mirror in a periodic fashion causes the mirror to be tilted with a larger maximum scan angle in one direction than in an opposing direction. This results in a slightly different scan pattern where for each half scan (see FIG. 4) slightly larger scan angles (than without the bias) are realized in one direction of the mirror 104 movement and slightly smaller scan angles (than without the bias) are realized in the opposite direction of the mirror movement. That is, each scan will have portions of the scan with larger scan angles than opposing portions of the scan. FIG. 5 illustrates a full rotation showing interspersed larger and smaller scan angles. Such embodiments enable a higher resolution in middle part of the scan compared to the edges of the scan.

Also, as the mirror movement is the slowest on the edges of the scan, assuming a sinusoidal waveform at the resonant frequency of the MEMS fast scanner, this can be used to even-out the accuracy uniformity in the middle of the scan image. As there are a large number of pixels in the middle of the image, the fastest moving part of the mirror movement could be unused and the target human eye resolution could be still reached. That is, there is potential for having more pixels available than would be perceptible by a user in the middle of the image. Thus, additional resource savings could be accomplished by not drawing pixels during some fastest portion of the MEMS fast scanner cycle. In particular, if there is difficulty in being able to pulse the laser with appropriate timing during this fastest portion, the laser could simply not be pulsed with no adverse effects. Note that when the MEMS mirror is biased, the fastest drawn pixels will be slightly off center in the image.

The higher resolution in the middle will make the achievable brightness in the middle also higher. However, brightness can be smoothed by having higher brightness output at the edges of a scan that in the middle part of the scan. That is, the light source may be modulated to output higher brightness at the edges than in the center. Brightness may be controlled by a gradient function from center toward edges as the pixel density is likewise defined by a gradient. Note that a step function could be used to control brightness when a bias is introduced as shown in FIG. 5. That is, a gradient function could be used along smaller angle portion of the scan with a step function implemented and the transition between the lower angle portion and the higher angle portion of the scan, followed by a gradient function along the higher angle portion of the scan.

A point spread function of the scanned light beam could also be tuned as a function of the field of view position to better fill the gaps in the scan lines at the edges of the scan area by increasing pixel size where needed. The tuning could be achieved, e.g., by optimizing the relay optics to defocus the beam at large field of view angles. In another embodiment, a separate component could be used to arbitrarily modulate the point spread function of the emitted beam as a function of time. In yet another embodiment, the MEMS fast scanner could be implemented in a way that it deforms the beam differently in different scan angles. By increasing the seen pixel size at the edges of the scan area (as compared to the pixels towards the middle area of the image), the gaps between the pixels could be filled and a more natural looking image can be produced. At the same time, the pixels in the middle area could be smaller (as compared to pixels towards the edges of the image) and enable the higher resolution at the middle of the image.

Figure 6:
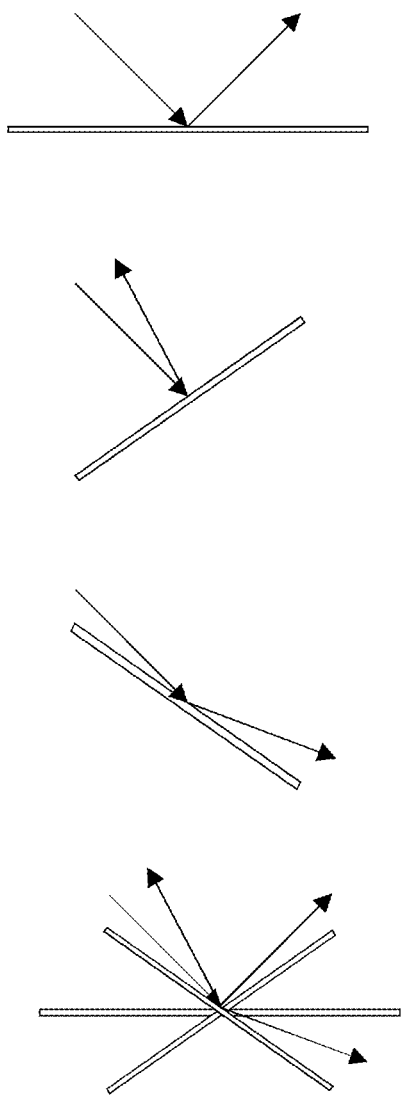
FIG. 6 illustrates ray reflections on a mirror.

Details of an alternative embodiment are illustrated by reference to FIG. 6. In this example, the fast scanner 106 has a 25 kHz frequency and ±25° scan angle for the mirror 104. For a ±50° circular field of view (FOV) embodiments could be implemented where the mirror 104 is initially tilted 10° in the scanning axis. If the input beam comes in at a 45° angle, the output beam would scan from −70° to +70° as illustrated in FIG. 6.

Figure 7:
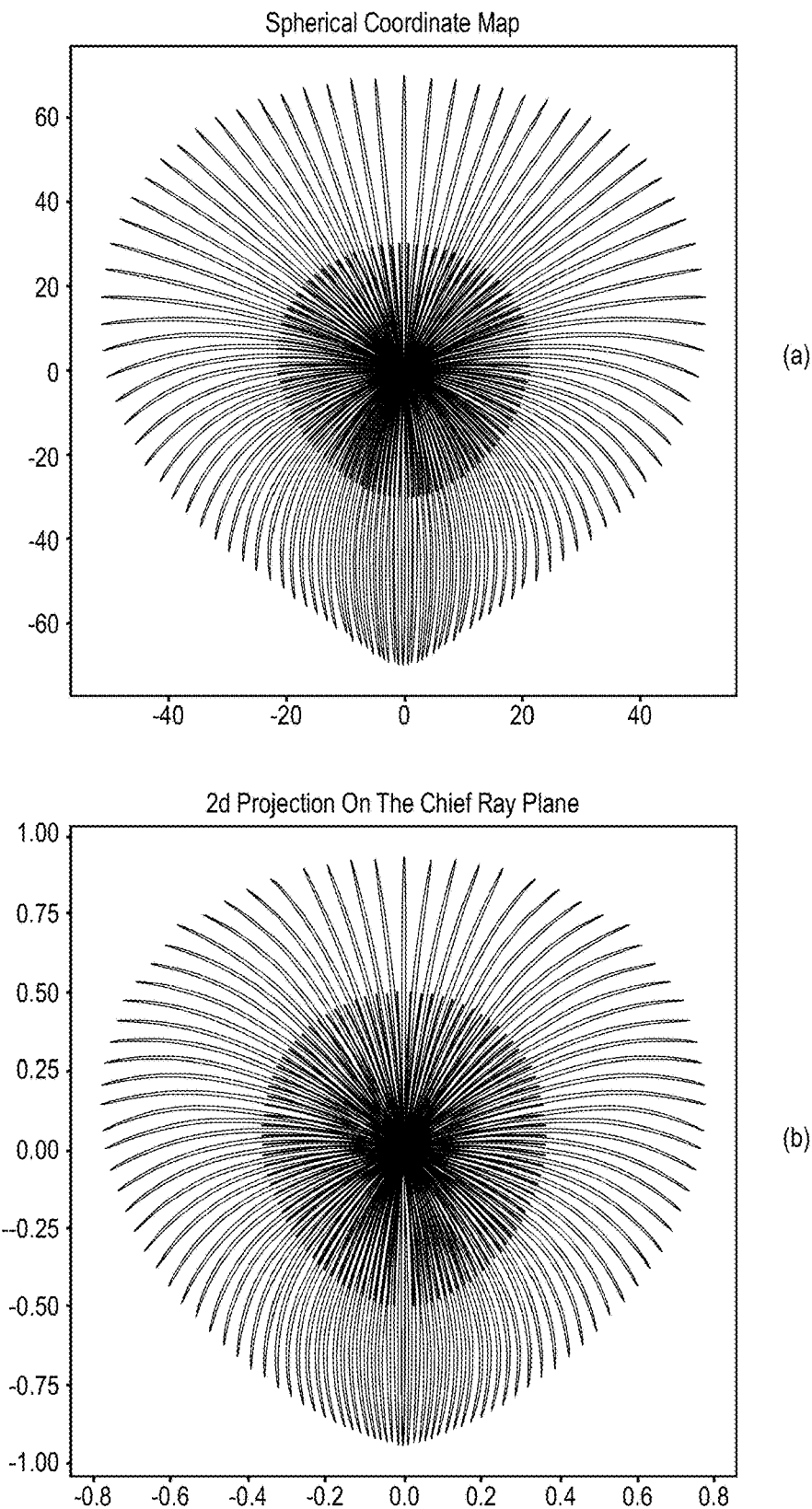
FIG. 7 illustrates graphs showing a scan pattern of the system.
Figure 8:
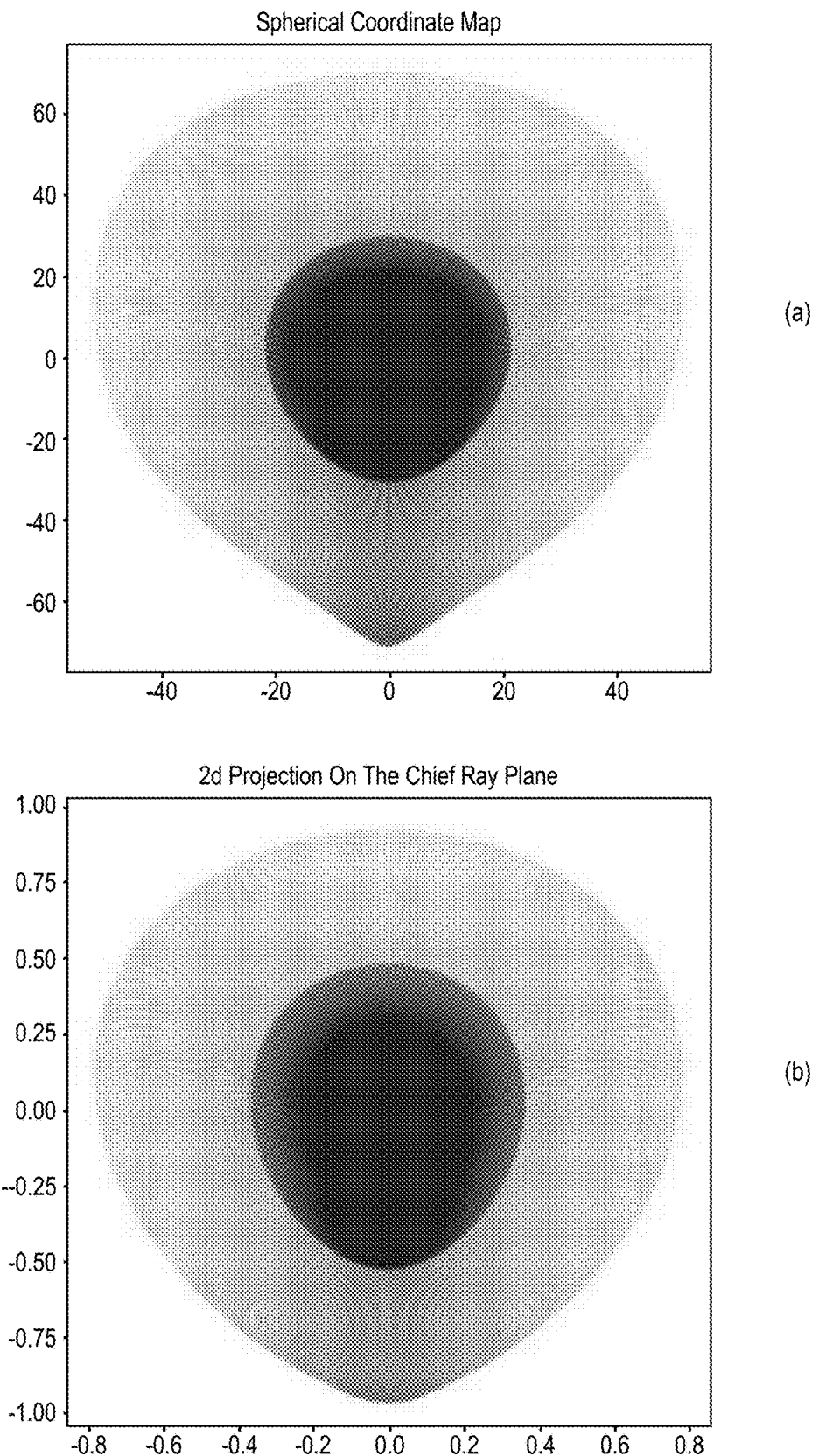
FIG. 8 illustrates graphs showing a scan pattern of the system.

By tuning the initial tilt of the mirror 104 and the rotation speeds of the rotary platform 108, various scan patterns can be achieved. For example, as illustrated in FIGS. 7 and 8, in one embodiment, a fast scanner 106 has a 25 kHz frequency and ±25° scan angle, 10° initial tilt, and 45° input beam angle (from the bottom of the scan). If the rotation of the rotary platform is selected to have a rotation frequency of 25 kHz/100.2, 5 subscans occur for every pixel of the scan and the scan patterns repeats itself at approximate a 50 Hz frequency. Note that by tuning the number of fast scan cycles per rotation cycle, more or less subscans can be obtained.

FIG. 7 illustrates an example where the first 4 ms of the scans are shown in spherical coordinates (a) and as projected on the plane normal to chief ray (b). FIG. 8 illustrates an example where the first 20 ms of the scans are shown in spherical coordinates (a) and as projected on the plane normal to chief ray (b).

As illustrated, the inner portions of the image are much more pixel dense than the outer portions. In this particular example, there are 400 pixels per rotation in the most pixel dense portion of the inner portion 802 and 200 pixels per rotation in the less pixel dense portion of the outer portion 804 at 50 Hz frequency.

Due to the sub-scanning discussed previously, the illustrated embodiment also has 5 "subpixels" that can be used as required to reach total resolution of 2000 subpixels per rotation in the inner portion 802 and 1000 sub pixels per rotation at the perimeter of the outer portion 804, each scanned once per every 20 ms. In the illustrated example, this results in a 45 pixels/degree density at scan angles roughly <9° in one direction and <5° in the other.

The fovea (highest-resolution area of the retina) can roughly "see" the central two degrees of the visual field, meaning that there would still be pixel dense middle area in the display. Embodiments can be further optimized to obtain even more uniform pixel density in the central area of a scan. Indeed, in some embodiments, a calibration mode can be performed to select optimized fast scanner frequency, fast scanner scan angle range, mirror biasing (which can be accomplished by biasing the fast scanner and/or the mirror on the fast scanner), rotary platform rotation frequency, or other factors. This calibration can be done by human input selecting various operating parameter, automated adjustment by observing user reaction to changed parameters, etc.

Figure 9:
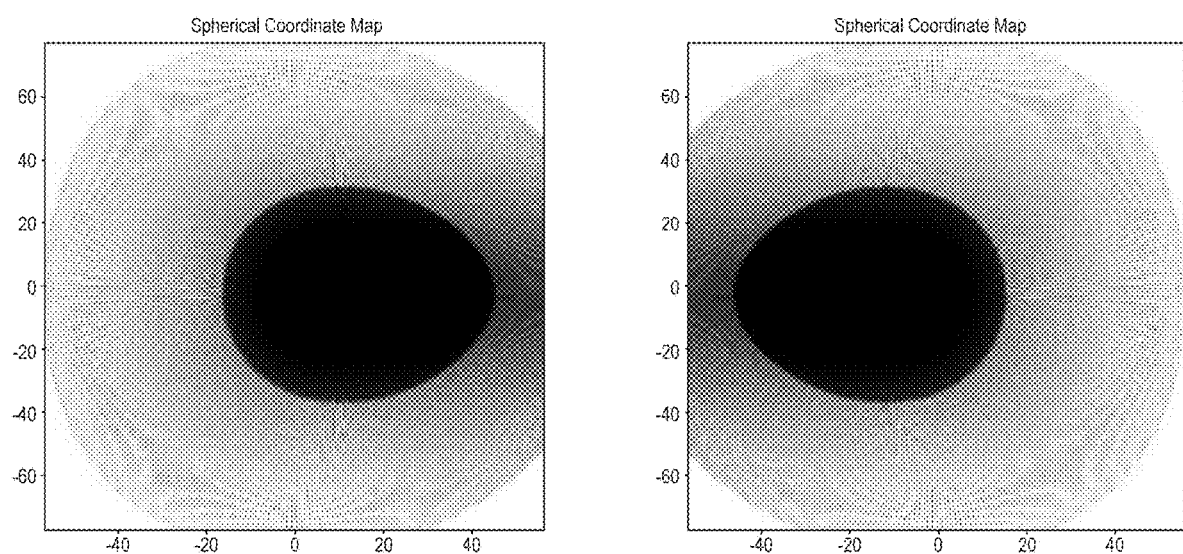
FIG. 9 illustrates graphs showing a scan pattern of the system for binocular vision.
Figure 10:
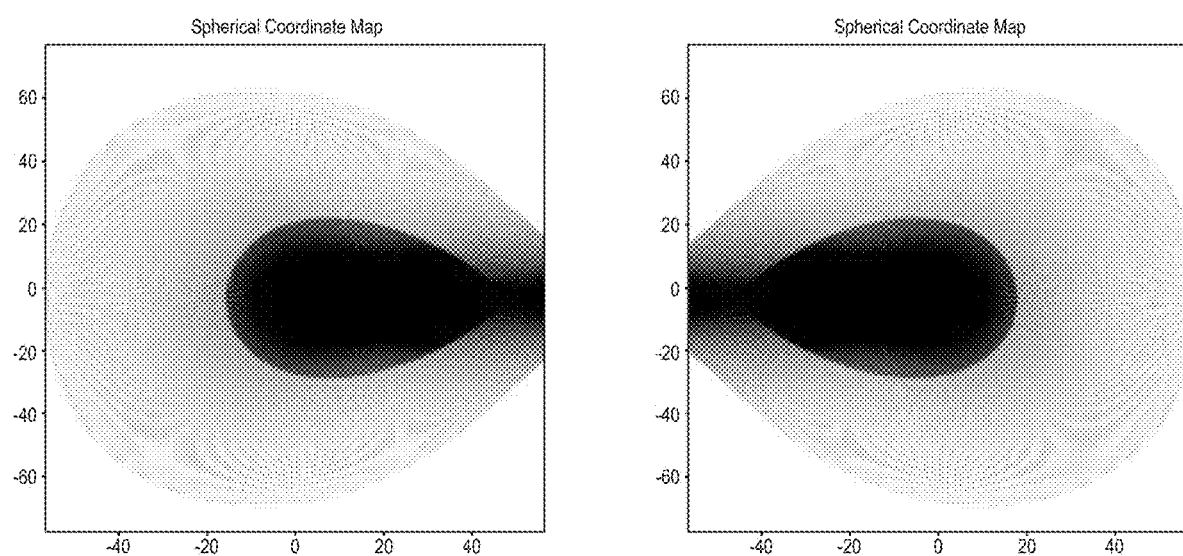
FIG. 10 illustrates graphs showing a scan pattern of the system for binocular vision.
Figure 11:
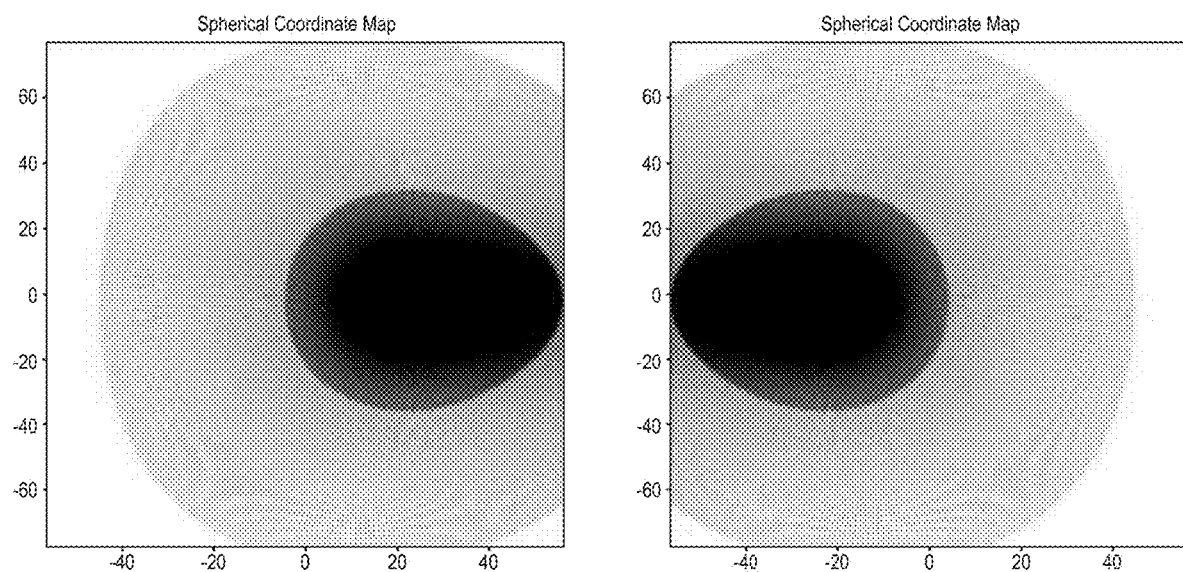
FIG. 11 illustrates graphs showing a scan pattern of the system for binocular vision.

For binocular mixed reality headset, and as illustrated in FIGS. 9, 10, and 11, embodiments can orient scan images in such a way that they best match with human vision. FIGS. 9 and 10 show the different input beam angles as seen compared to the chief ray axis (which depends on the input beam angle). FIG. 11 is similar to FIG. 9 but drawn again using the same chief-ray axis as FIG. 10 to illustrate how the image moves around. The actual 0-axis of the image will depend on the location of the waveguide (which in some embodiments may be based on surface relief gratings)/relay optics input pupil. Thus, the shape of the scan can be tuned slightly by the incoming beam angle as well. For example, FIG. 10, illustrates a 60° input beam angle from the light source 102 as compared to the example using a 45° input beam angle from the light source 102 illustrated in FIG. 9.

If the light source 102 input is maintained at a constant position, embodiments can simply scan the input beam angle by scanner to move the higher resolution region around as shown in the in FIG. 11, where input angle is changed from 45° to 60°, but the 0° angle of the plot (chief ray) is the same. For example, in FIG. 15, an additional 1D or 2D slow scanner 112 is coupled to another mirror 114 to adjust the input angle of light.

Figure 15:
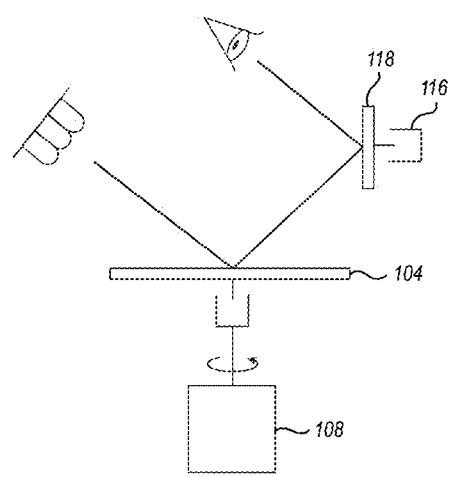
FIG. 15 illustrates an enhanced system for directing output light.

Alternatively, as illustrated in FIG. 15, the MEMS fast scanner 106 output could be fed (directly, or through relay optics) into a 2D slow scanner 116 and mirror(s) 118 that follow the eyes of the user to project the most high-resolution portions of the image into an optimal location (typically at the center of the user's eye) for the user.

Note that in some embodiments, the scan can be adjusted to compensate for sight artifacts of a user. For example, in some embodiments, the specific inter-pupillary distance for a user can be measured by a system (e.g., the system illustrated in FIG. 17), or can be input by a user. Input angles, and/or output from a slow scanner can be adjusted between different projection systems (noting that typically two projection systems are used for binocular visions) to compensate for the specific inter-pupillary distance. Alternatively, or additionally, some embodiments may be able to adjust where the highest resolution portions of the image are displayed to correct for astigmatisms or other particularities for a particular user. For example, a user's prescription can be provided to the system illustrated in FIG. 17, and the system can adjust the various angles as described previously to compensate.

If there is a tilt in the rotation axis to make it not perpendicular to the scanning axis, it will produce a hole in the field of view, as illustrated in FIG. 12. However, this can be compensated for by modulating the tilt in the rotation axis with respect to the scanning axis. Thus, the rotation axis and the scanning axis of the fast scanner need to be either accurately aligned or have some modulation capability.

For example, as illustrated in FIG. 13, if 5° of sinusoidal modulation is introduced into the rotation axis with 4× the rotation frequency, and a 4° base tilt is added, the resulting scan image will be as shown FIG. 13.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 16:
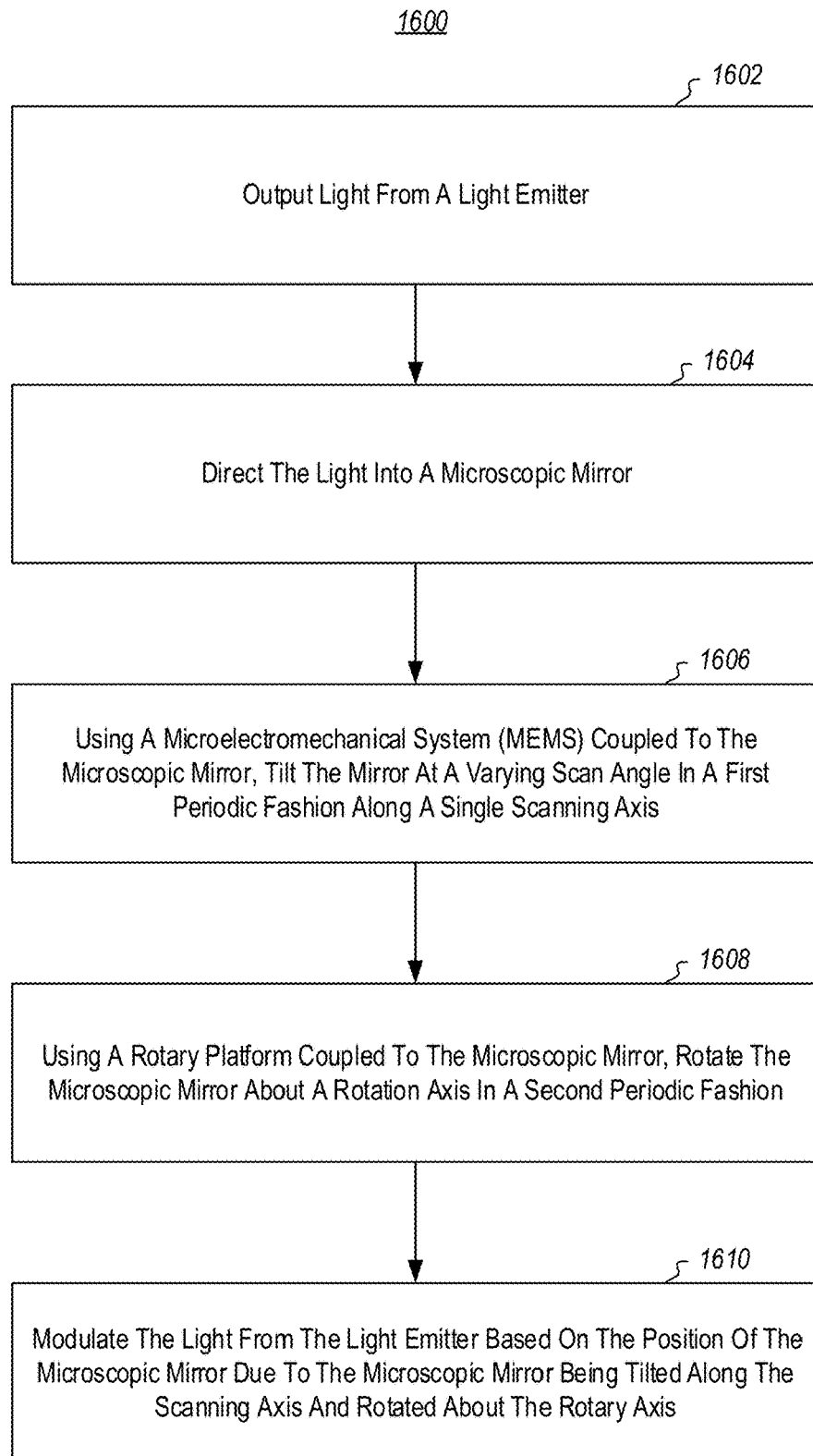
FIG. 16 illustrates a method of projecting an image.

Referring now to FIG. 16, a method 1600 is illustrated.

The method 1600 includes acts for projecting an image in a head mounted display (HMD). The method includes outputting light from a light emitter (act 1602). For example, as illustrated in FIG. 1, light is output from the light source 102.

The method 1600 further includes directing the light into a microscopic mirror (act 1604). For example, as illustrated in FIG. 1, light from the light source is directed into the mirror 104.

The method 1600 further includes using a microelectromechanical system (MEMS) coupled to the microscopic mirror, tilting the mirror at a varying scan angle in a first periodic fashion along a single scanning axis (act 1606). For example, the MEMS fast scanner 106 can be used to tile the mirror 104.

The method 1600 further includes using a rotary platform coupled to the microscopic mirror, rotating the microscopic mirror about a rotation axis in a second periodic fashion (act 1608). For example, the rotary platform 108 can be used to rotate the mirror 104.

The method 1600 further includes modulating the light from the light emitter based on the position of the microscopic mirror due to the microscopic mirror being tilted along the scanning axis and rotated about the rotary axis (act 1610). For example, the output of color and intensity of light from the light source 102 will vary depending on the tilted position and rotational position of the mirror 104.

The method 1600 may be practiced where the mirror is biased about the scanning axis such that tilting the mirror in the first periodic fashion causes the mirror to be tilted with a larger maximum scan angle in one direction than in an opposing direction. The discussion of FIGS. 4 and 5 above illustrate how this might be accomplished and the effects of the biasing.

The method 1600 may further include selecting the first periodic fashion and the second periodic fashion to be harmonically disparate. As discussed above in conjunction with the description of FIG. 2, this can be done to fill or reduce the size of gaps in an image.

The method 1600 may be practiced where the first periodic fashion and the second periodic fashion are selected to have a predetermined phase shift between the first periodic fashion and the second periodic fashion to produce a predetermined number of subscans.

The method 1600 may be practiced where the method is performed in a binocular head mounted display (HMD) system.

The method 1600 may be practiced where the rotation axis is controlled to be perpendicular to the scanning axis. As discussed in conjunction with the description of FIGS. 12 and 13, this can be done to prevent holes in the image.

The method 1600 may further include modulating an orientation of the rotation axis with respect to the scanning axis. As illustrated in FIG. 13, this can be done to prevent holes in the image.

Figure 14:
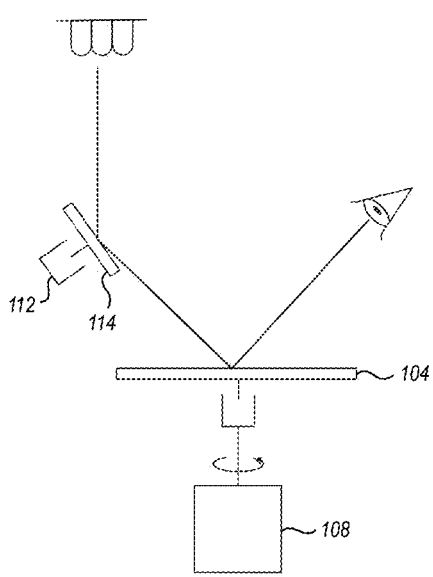
FIG. 14 illustrates an enhanced system for directing input light.

The method 1600 may further include reflecting light output from the mirror to adjust a location of a high-resolution portion of an image. FIGS. 14 and 15, for example, illustrate various way in which this may be accomplished.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Figure 17:
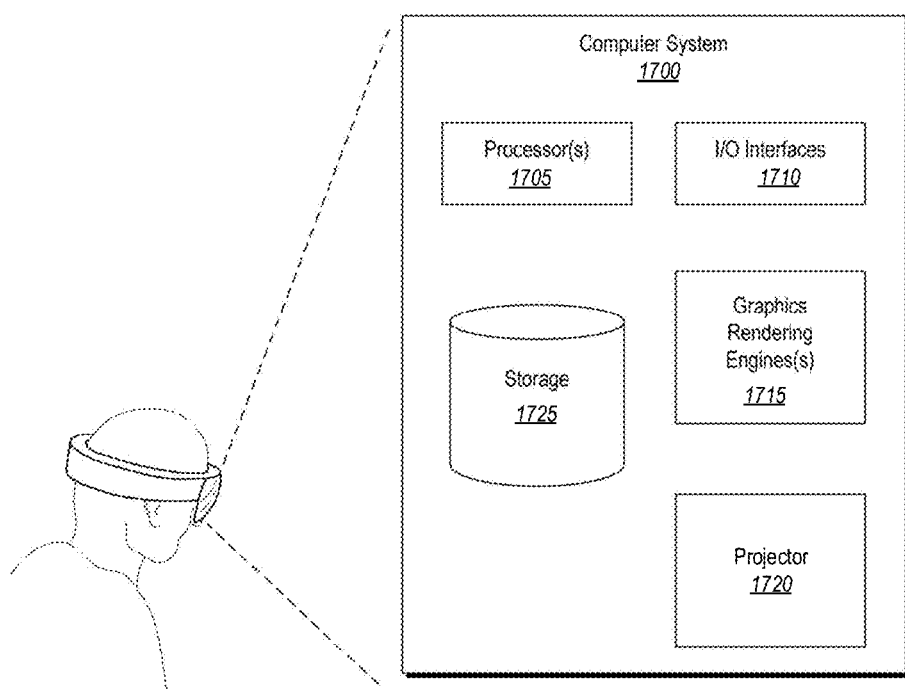
FIG. 17 illustrates an example computer system.

Having just described the various features and functionalities of some of the disclosed embodiments, attention is now directed to FIG. 17, which illustrates an example computer system 1700 that may be used to facilitate the operations described herein. It will be appreciated that, in some instances, aspects of the systems illustrated and the computer system 1700 shown in FIG. 17 can be used in combination to carry out the embodiments described herein.

The computer system 1700 may take various different forms. For example, in FIG. 17, the computer system 1700 is embodied as a head-mounted display (HMD). Although the computer system 1700 may be embodied as an HMD, the computer system 1700 may also be a distributed system that includes one or more connected computing components/devices that are in communication with the HMD. Accordingly, the computer system 1700 may be embodied in any form and is not limited strictly to the depiction illustrated in FIG. 17. By way of example, the computer system 1700 may include a projector, desktop computer, a laptop, a tablet, a mobile phone, server, data center and/or any other computer system.

In its most basic configuration, the computer system 1700 includes various different components. For example, FIG. 17 shows that computer system 1700 includes at least one hardware processing unit 1705 (aka a "processor"), input/output (I/O) interfaces 1710, graphics rendering engines 1715, a projector 1720, and storage 1725. More detail on the hardware processing unit 1705 will be presented momentarily.

The storage 1725 may be physical system memory, which may be volatile, non-volatile, or some combination of the two. The term "memory" may also be used herein to refer to non-volatile mass storage such as physical storage media. If the computer system 1700 is distributed, the processing, memory, and/or storage capability may be distributed as well. As used herein, the term "executable module," "executable component," or even "component" can refer to software objects, routines, or methods that may be executed on the computer system 1700. The different components, modules, engines, and services described herein may be implemented as objects or processors that execute on the computer system 1700 (e.g. as separate threads).

The disclosed embodiments may comprise or utilize a special-purpose or general-purpose computer including computer hardware, such as, for example, one or more processors (such the hardware processing unit 1705) and system memory (such as storage 1725), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 1700 may also be connected (via a wired or wireless connection) to external sensors (e.g., one or more remote cameras, accelerometers, gyroscopes, acoustic sensors, magnetometers, etc.). It will be appreciated that the external sensors include sensor systems (e.g., a sensor system including a light emitter and camera), rather than solely individual sensor apparatuses. FIG. 1. Further, the computer system 1700 may also be connected through one or more wired or wireless networks to remote systems(s) that are configured to perform any of the processing described with regard to computer system 1700.

During use, a user of the computer system 1700 is able to perceive information (e.g., a mixed-reality environment) through a display screen that is included among the I/O interface(s) 1710 and the projector 1720 that is visible to the user. For example, the projector 1720 may include the projection system 100 illustrated in FIG. 1. The I/O interface(s) 1710 may include the input elements described herein, which are linked to one or more underlying applications.

The I/O interface(s) 1710 and sensors may also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

The graphics rendering engine 1715 is configured, with the hardware processing unit 1705 and the projector 1720, to render one or more virtual objects within the scene. As a result, the virtual objects accurately move in response to a movement of the user and/or in response to user input as the user interacts within the virtual scene.

A "network," is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 1700 will include one or more communication channels that are used to communicate with the network 1735. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the hardware processing unit 1705). For example, and without limitation, illustrative types of hardware logic components that can be used include Field-Programmable Gate Arrays (FPGAs), Application-Specific Integrated Circuits (ASICs), Application-Specific Standard Products (ASSPs), System-On-A-Chip Systems (SOCs), Complex Programmable Logic Devices (CPLDs), Central Processing Units (CPUs), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A projector system in a head mounted display (HMD) comprising:
    a microscopic mirror;
    a microelectromechanical system (MEMS) coupled to the microscopic mirror and configured to tilt the microscopic mirror at a varying scan angle in a periodic fashion along a single scanning axis;
    a rotary platform directly connected to the microscopic mirror and configured to rotate the microscopic mirror up to and including 360 degrees about a rotation axis at a rotational frequency; and
    a light emitter configured to direct light into the microscopic mirror, wherein the light emitter is configured to be modulated based on the position of the microscopic mirror due to the microscopic mirror being tilted along the scanning axis and rotated about the rotary axis,
    wherein the projector system is configured to generate an image by scanning the light in accordance with a determined scan pattern, and wherein the scan pattern is selected to be a curvilinear scan pattern, resulting in the scan pattern not being a straight-line rectangular scan pattern, and
    wherein the MEMS is further configured to deform the light differently for different scan angles provided by the MEMS, said deforming enables pixels of different sizes to be projected by the projector system.

2. The projector system of claim 1, wherein the microscopic mirror is biased about the scanning axis such that tilting the microscopic mirror in the periodic fashion causes the microscopic mirror to be tilted with a larger maximum scan angle in one direction than in an opposing direction.

3. The projector system of claim 1, wherein the periodic fashion and rotations of the microscopic mirror are selected to be harmonically disparate.

4. The projector system of claim 1, wherein the periodic fashion and rotations of the microscopic mirror are selected to have a predetermined phase shift to produce subscans of the projector system.

5. The projector system of claim 1, wherein said deforming is performed by changing a point spread function of the light as a function of a field of view position in an image produced by the projector system to vary pixel sizes in the image.

6. The projector system of claim 1, wherein the projector system is configured for use in a binocular head mounted display (HMD) system.

7. The projector system of claim 1, wherein the rotation axis is perpendicular to the scanning axis.

8. The projector system of claim 1, wherein an orientation of the rotation axis is configured to be modulated with respect to the scanning axis.

9. The projector system of claim 1, further comprising a slow scanner optically coupled to the microscopic mirror,
wherein an image, which is generated by the projector system, includes both a high-resolution portion and a lower resolution portion, and
wherein a display location for the high-resolution portion of the image is adjustable to match a location where a user is looking.

10. A method of causing a projector system in a head mounted display (HMD) to project an image, the method comprising:
    outputting light from a light emitter;
    directing the light into a microscopic mirror;
    using a microelectromechanical system (MEMS) coupled to the microscopic mirror, tilting the microscopic mirror at a varying scan angle in a periodic fashion along a single scanning axis;
    using a rotary platform coupled to the microscopic mirror, rotating the microscopic mirror up to and including 360 degrees about a rotation axis at a rotational frequency; and
    modulating the light from the light emitter based on the position of the microscopic mirror due to the microscopic mirror being tilted along the scanning axis and rotated about the rotary axis,
    wherein an image is generated by scanning the light in accordance with a determined scan pattern, and wherein the scan pattern is selected to be a curvilinear scan pattern, resulting in the scan pattern not being a straight-line rectangular scan pattern,
    wherein the MEMS is further configured to deform the light differently for different scan angles provided by the MEMS, said deforming enabling pixels of different sizes to be projected by the projector system.

11. The method of claim 10, wherein the microscopic mirror is biased about the scanning axis such that tilting the microscopic mirror in the periodic fashion causes the microscopic mirror to be tilted with a larger maximum scan angle in one direction than in an opposing direction.

12. The method of claim 10 further comprising selecting the periodic fashion and rotations of the microscopic mirror to be harmonically disparate.

13. The method of claim 10 further wherein the periodic fashion and rotations of the microscopic mirror are selected to have a predetermined phase shift to produce a predetermined number of sub scans.

14. The method of claim 10, wherein said deforming is performed by changing a point spread function of the light as a function of a field of view position in the image to vary pixel sizes in the image.

15. The method of claim 10 further comprising, wherein the method is performed in a binocular head mounted display (HMD) system.

16. The method of claim 10, wherein the rotation axis is controlled to be perpendicular to the scanning axis.

17. The method of claim 10 further comprising, modulating an orientation of the rotation axis with respect to the scanning axis.

18. The method of claim 10, wherein:
    an image, which is generated by the projector system, includes both a high-resolution portion and a lower resolution portion, and
    a display location for the high-resolution portion of the image is adjustable to match a location where a user is looking.

19. A wearable system configured to project an image, said wearable system comprising:
one or more processors; and
one or more computer-readable media having stored thereon instructions that are executable by the one or more processors to cause the wearable system to:
output light from a light emitter;
direct the light into a microscopic mirror;
using a microelectromechanical system (MEMS) coupled to the microscopic mirror, tilt the microscopic mirror at a varying scan angle in a periodic fashion along a single scanning axis;
using a rotary platform coupled to the microscopic mirror, rotate the microscopic mirror up to and including 360 degrees about a rotation axis at a rotational frequency; and
modulate the light from the light emitter based on the position of the microscopic mirror due to the microscopic mirror being tilted along the scanning axis and rotated about the rotary axis,
wherein the system is configured to generate an image by scanning the light in accordance with a determined scan pattern, and wherein the scan pattern is selected to be a curvilinear scan pattern, resulting in the scan pattern not being a straight-line rectangular scan pattern, and
wherein the MEMS is further configured to deform the light differently for different scan angles provided by the MEMS, said deforming enabling pixels of different sizes to be projected by the projector system.

20. The wearable system of claim 19, wherein the instructions are further executable to cause the wearable system to modulate an orientation of the rotation axis with respect to the scanning axis.

* * * * *